US010208853B2

(12) United States Patent
Roos et al.

(10) Patent No.: US 10,208,853 B2
(45) Date of Patent: Feb. 19, 2019

(54) MOTOR ASSEMBLY (71) Applicant: BROSE FAHRZEUGTEILE GMBH & CO. KOMMANDITGESELLSCHAFT, WUERZBURG, Wuerzburg (DE)

(72) Inventors: Stephan Roos, Wertheim-Hoehefeld (DE); Martin Pondelek, Wuerzburg (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 255 days.

(21) Appl. No.: 15/055,825

(22) Filed: Feb. 29, 2016

(65) Prior Publication Data
US 2016/0268875 A1 Sep. 15, 2016

(30) Foreign Application Priority Data

Sep. 4, 2015 (DE) .................. 10 2015 217 020

(51) Int. Cl.
*H02K 5/10* (2006.01)
*H02K 5/22* (2006.01)
(Continued)

(52) U.S. Cl.
CPC ..... *F16H 61/0204* (2013.01); *F16H 61/0006* (2013.01); *F16H 61/32* (2013.01);
(Continued)

(58) Field of Classification Search
CPC ............ H02K 5/10; H02K 5/12; H02K 5/124; H02K 5/22; H02K 5/225; H02K 11/30;
(Continued)

(56) References Cited

U.S. PATENT DOCUMENTS 5,905,320 A 5/1999 Periyathamby et al.
7,847,446 B2 12/2010 Becker et al.
(Continued)

FOREIGN PATENT DOCUMENTS

CN 202009303 U 10/2011
DE 69810248 T2 7/2003
(Continued)

OTHER PUBLICATIONS

Hiratsuka et al., Machine Translation of JP2012241565, Dec. 2012.*
Minebea, Machine Translation of DE20304904, Feb. 2004.*

*Primary Examiner* — Quyen P Leung
*Assistant Examiner* — Eric Johnson
(74) *Attorney, Agent, or Firm* — Laurence A. Greenberg; Werner H. Stemer; Ralph E. Locher (57) ABSTRACT

A motor assembly has an electric motor with a motor housing and an electronics unit. A first housing shell is formed as a motor carrier and has the motor housing fastened to it. A second housing shell is in the form of a cooling cover. An electronics carrier is arranged in sandwich-like fashion between the cooling cover and the motor carrier. The electronics carrier has, at the cooling cover side, a first, circumferentially encircling seal which seals off a first contact edge formed between the electronics carrier and the cooling cover and the electronics carrier has, at the motor carrier side, a second, circumferentially encircling seal which seals off a second contact edge formed between the electronics carrier and the motor carrier.

12 Claims, 9 Drawing Sheets (51) Int. Cl.
*F16H 61/00* (2006.01)
*F16H 61/02* (2006.01)
*H02K 11/00* (2016.01)
*H02K 11/33* (2016.01)
*F16H 61/32* (2006.01)

(52) U.S. Cl.
CPC ............... *H02K 5/10* (2013.01); *H02K 5/225* (2013.01); *H02K 11/33* (2016.01)

(58) Field of Classification Search
CPC .... H02K 11/33; H02K 5/132; F16H 61/0006; F16H 61/0251; F16H 61/0204; F16H 61/0031; F16H 57/0441
USPC .......................... 310/68 D, 71, 85, 87, 88, 89
See application file for complete search history.

(56) References Cited

U.S. PATENT DOCUMENTS

| | | | |
|---|---|---|---|
| 2002/0060105 A1* | 5/2002 | Tominaga | B62D 5/0406 180/443 |
| 2007/0251473 A1 | 11/2007 | Schafer et al. | |
| 2008/0318724 A1* | 12/2008 | Lott | F16H 61/32 475/149 |
| 2009/0078489 A1 | 3/2009 | Feier et al. | |
| 2011/0181221 A1 | 7/2011 | Asahi et al. | |
| 2012/0031215 A1 | 2/2012 | Feier | |
| 2014/0054991 A1* | 2/2014 | Hyodo | F04C 2/18 310/71 |
| 2014/0191598 A1 | 7/2014 | Winheim et al. | |
| 2015/0357886 A1 | 12/2015 | Ishizeki et al. | |
| 2016/0254731 A1* | 9/2016 | Roos | H02K 11/215 310/43 |
| 2017/0299047 A1* | 10/2017 | Warnecke | F16H 57/0441 |

FOREIGN PATENT DOCUMENTS

| | | |
|---|---|---|
| DE | 20304904 U1 | 2/2004 |
| DE | 102005023202 A1 | 9/2006 |
| DE | 202005010252 U1 | 11/2006 |
| DE | 102005062784 A1 | 7/2007 |
| DE | 102006032780 A1 | 1/2008 |
| DE | 102008040318 A1 | 1/2010 |
| DE | 102007063694 A1 | 9/2010 |
| DE | 102009014595 A1 | 9/2010 |
| DE | 102011112821 A1 | 3/2013 |
| DE | 102012213234 A1 | 1/2014 |
| DE | 102013017976 A1 | 6/2015 |
| EP | 2214293 A1 | 8/2010 |
| JP | 2012241565 A * | 12/2012 |
| WO | 2013037454 A2 | 3/2013 |
| WO | 2014104121 A1 | 7/2014 |

* cited by examiner

MOTOR ASSEMBLY

BACKGROUND OF THE INVENTION

Field of the Invention

The invention relates to a motor assembly having an electric motor comprising a motor housing, and an electronics unit. The invention also relates to an actuator, in particular a gearbox actuator, for a motor vehicle, having a motor assembly of said type, and to a motor vehicle transmission equipped with an actuator of said type.

WO 2013/037454 A2 has disclosed an electric motor which may be a constituent part of an actuator for a motor vehicle transmission, in particular for a direct shift transmission (DSG). In the case of a hydraulic actuator, the electric motor may serve for driving a hydraulic pump.

For this purpose, the known electric motor has a cylindrical motor or stator housing in which a stator assembly with a rotating-field coil is mounted so as to be fixed with respect to the housing, and a rotor together with a rotor shaft fixed to the rotor is mounted in rotationally movable fashion. For the coupling for example to the hydraulic pump of the actuator, the motor shaft is led out, so as to form a shaft stub, on one housing side of the electric motor. The opposite housing side has an attachment flange for the fastening of the actuator for example to an electronics unit having an electronics housing and having power or motor electronics.

During the operation of an electric motor of said type, in particular in the case of said electric motor being used as a gearbox actuator for a DSG of a motor vehicle, said electric motor is commonly exposed to humid surroundings. Under such ambient conditions, there is the risk of moisture, for example water, entering the region of the motor electronics via housing interfaces of the electronics housing and/or of the attachment flange. This is highly undesirable in particular with regard to a risk of short-circuiting.

In a typical application as gearbox actuator, the electric motor of a hydraulic oil pump is coupled in terms of drive within an oil sump of a gearbox housing. For the purposes of cooling the rotating-field coil, it is known here for the electric motor to be situated at least partially within a (hydraulic) oil in the oil sump. The electronics unit is expediently installed close to the electric motor, such that, for the protection of the sensitive motor electronics, it is necessary for an electronics housing to be provided which is as fluid-tight as possible also with respect to oil.

Here, the electric motor or the associated motor assembly of the actuator should be designed, or structurally configured, for a relatively large temperature range. The temperature range that must be managed or allowed for in the oil sump typically lies between for example −40° C. and +130° C. It must also be taken into consideration here that the oil used exhibits a certain or particular viscosity, which is temperature-dependent and which decreases with increasing temperature, that is to say is greater at relatively low temperatures than at relatively high temperatures.

In particular in the presence of relatively high operating temperatures or in the presence of operationally induced rising temperatures, the risk of leakages therefore also increases. A reason for this is that, firstly, the prevention of leakages necessitates a correspondingly sealed electronics housing, whereas on the other hand, owing to the high temperature fluctuations, housing expansions, that is to say different expansions of the electronics housing and/or of the attachment flange, in the presence of increasing temperatures and thus decreasing viscosity of the oil used give rise to an increased tendency for leakage, said tendency being relatively less pronounced in the presence of low temperatures and thus high viscosity of the oil.

BRIEF SUMMARY OF THE INVENTION

The invention is based on the object of specifying a motor assembly which provides a fluid-tight electronics housing for motor electronics. It is also sought to specify an actuator for a motor vehicle having a motor assembly of said type, and to specify a motor vehicle gearbox having an actuator of said type.

According to the invention, the stated object is achieved, with regard to the motor assembly, by way of the claimed assembly, with regard to an actuator comprising the motor assembly, by way of the features of the claimed assembly, and with regard to a motor vehicle gearbox having an actuator of said type, by way of the features as claimed. The respective dependent claims relate to advantageous embodiments and refinements.

The motor assembly according to the invention has an electric motor with a motor housing, and has an electronics unit. The electronics unit comprises a first housing shell which is formed as a motor carrier and to which the motor housing is fastened, a second housing shell in the form of a cooling cover, and an electronics carrier which is arranged in sandwich-like fashion between the cooling cover and the motor carrier. The electronics carrier has, at the cooling cover side, that is to say on a side facing toward the cooling cover, a first, circumferential seal, wherein the first seal seals off a first contact edge formed between the electronics carrier and the cooling cover. Furthermore, the electronics carrier has, at the motor carrier side, that is to say on a side facing toward the motor carrier, a second, circumferential seal, wherein the second seal seals off a second contact edge formed between the electronics carrier and the motor carrier.

The cooling cover, the motor carrier and the electronics carrier thus form a substantially closed and fluid-tight electronics housing, wherein the electronics carrier at least partially forms a housing wall running in a circumferential direction. Furthermore, two separate housing chambers are formed by way of the sandwich-like arrangement. A first housing chamber is formed between the electronics carrier and the cooling cover, wherein the first housing chamber is sealed off with respect to the first contact edge by way of the first seal. A second housing chamber is correspondingly formed between the electronics carrier and the motor carrier, wherein the second housing chamber is correspondingly sealed off by way of the second seal at the second contact edge.

In other words, the electronics carrier thus divides the housing interior chamber into two subregions in fluid-tight fashion. Thus, in relation to the prior art, the risk of leakage of an oil into (motor) electronics is substantially eliminated. The electric motor, which is at least partially situated in oil during operation, is arranged in a different housing subregion than the sensitive electronics. Furthermore, it is made possible in this way for the first seal and the second seal to be designed and configured independently of one another.

In a preferred installation situation, the electric motor is situated at least partially in an oil sump of a motor vehicle gearbox, such that the second seal is designed in particular for fluid-tight sealing of the second contact edge with respect to oil. In particular, it is necessary for the second seal to reliably prevent leakage over a large temperature range.

The first seal is arranged on the opposite side of the electronics carrier, and is thus designed merely with regard to an ingress of moisture, in particular with regard to an ingress of water. In this way, the production of the first seal is particularly inexpensive, which has an advantageous effect on the production costs of the motor assembly.

In a suitable refinement, the motor carrier and the cooling cover are braced directly against one another. In this way, an adequate contact or seal pressure on the first and second seals is realized. The motor carrier and the cooling cover are preferably not fastened directly to the electronics carrier but rather in particular braced together such that substantially only pressure forces, but no significant bending or torsion forces, are exerted on the electronics carrier. Thus, in the context of the invention, the electronics carrier is held clamped, or fixed by clamping, between the cooling cover and the motor carrier in the region of the contact edges.

In a suitable embodiment, the first seal and the second seal are arranged in alignment with one another in the direction of action of the bracing of the motor carrier and of the cooling cover. In this way, the first and the second seal are, in the assembled state, supported on one another, which contributes to an elimination of bending or torsion forces acting on the electronics carrier. Through the avoidance of bending and/or torsion forces on the electronics carrier, it is therefore ensured that motor electronics carried by the electronics carrier are arranged so as to operate reliably.

In a preferred embodiment, the motor electronics has an electronic inverter circuit, carried by the electronics carrier, for the energization and operation of the electric motor. For this purpose, the inverter circuit is connected, in a terminal region of a motor carrier-side surface of the electronics carrier, by way of contact elements to phase terminals of the electric motor. The terminal region is expediently arranged on the electronics carrier so as to be aligned with the motor housing fastened to the motor carrier, in particular in the region of an outer circumference of the motor housing. The terminal region is, by way of a secant-like internal web of the second seal, delimited in fluid-tight fashion with respect to a circuit region of the motor carrier-side surface of the electronics carrier, on which at least one electronic component of the inverter circuit, in particular an intermediate capacitor and/or an associated throttle coil, is arranged.

The secant-like internal web thus divides the second housing chamber, which is bordered by the second seal, into the terminal region and the circuit region. In other words, the internal web runs from a long side of the preferably elongate electronics carrier to the opposite long side. In the preferred installation situation, the second housing chamber is arranged in the region of an oil sump. By way of the internal web, or the fluid-tight delimitation that it generates between the circuit region and the terminal region, additional structural space for electronic components of the inverter circuit is created by way of the circuit region.

It is preferably the case in particular that passive components with a relatively large installation size, such as for example the intermediate capacitor or the throttle coil, are arranged within the circuit region, because, firstly, they exhibit low sensitivity to the temperatures arising close to the oil sump during operation. Secondly, in this way, it is made possible to realize a cooling cover which is particularly compact in terms of structural space, which yields additional degrees of freedom for the utilization of existing structural space.

In a particularly expedient embodiment, on the cooling cover, there is integrally formed a number of spacer elements which extend from the motor carrier side and which engage around the electronics carrier at least in sections and which bear in each case against a corresponding abutment surface of the motor carrier. The spacer elements have approximately the height of the electronics carrier, such that a predefined contact pressure during the bracing of the cooling cover to the motor carrier is defined. By way of the suitably circumferentially arranged spacer elements, bending or torsion of the cooling cover during the bracing is prevented in a structurally simple manner. Furthermore, in this way, a substantially uniform contact pressure or seal pressure along the circumferential direction can be applied in the region of the first and second contact edges.

In a suitable refinement, the cooling cover and the motor carrier are screwed together in the region of the spacer elements. In this way, structurally simple bracing between the cooling cover and the motor carrier is realized, wherein the screw fastening in the region of the spacer elements assists in preventing bending or torsion forces from arising.

In an advantageous embodiment, the electronics unit has a connecting plug connector. The connecting plug connector is integrated in unipartite fashion into the electronics carrier, and is contacted by way of a lead frame, arranged within the electronics carrier, with the inverter circuit. The lead frame is preferably also connected to the contact elements in the terminal region. The connecting plug connector is integrally formed on the electronics carrier at the face side outside the first and second seals, that is to say the connecting plug connector is arranged substantially outside the first and second contact edges. In this way, no additional sealing of the cooling cover, of the motor carrier and/or of the electronics carrier with respect to the connecting plug connector is necessary. This is advantageous in particular with regard to different coefficients of expansion of the cooling cover, of the motor carrier and of the electronics carrier in the event of temperature fluctuations occurring during operation.

The internal web is not compressed by way of a bracing action, that is to say the contact or seal pressure for the fluid-tight delimitation between the terminal region and the circuit region is, in the assembled state, generated by the electronics carrier alone. Owing to thermal expansion during operation or as a result of wear, fluid-tight sealing by the internal web is sometimes not readily permanently ensured.

Therefore, in a particularly preferred refinement, the lead frame is bent partially or in stepped fashion in the region of the internal web for the purposes of stabilizing the electronics carrier. In this way, the electronics carrier is additionally stiffened in the region of the internal web, such that a fluid-tight delimitation between the terminal region and the circuit region by way of the internal web is ensured in an operationally reliable manner. For this purpose, the lead frame at least partially performs a load-bearing role of the electronics carrier, wherein the lead frame is for example of cranked or seamed form in the region of the internal web in order to increase a bending moment of the electronics carrier in said region.

In a possible refinement, it is for example the case that multiple parallel conductor tracks of the lead frame are arranged so as to run obliquely at an angle across the internal web, wherein the conductor tracks are, in the region of the internal web, bent partially transversely with respect to their longitudinal direction, that is to say the conductor tracks have an approximately L-shaped cross section in said region.

In an advantageous embodiment, the lead frame has a number of adjacent conduct tracks, wherein the conductor tracks have, in the region of the internal web, beams protruding perpendicularly to the longitudinal direction thereof as step-like bent-over regions. The step height thus formed is defined substantially by the width of the beams.

Therefore, in plan view, the conductor tracks are of approximately cross-shaped form, with the horizontal cross web being formed by the beam. The beams of adjacent conductor tracks at least partially overlap for the purposes of stiffening the electronics carrier.

The motor carrier and the cooling cover are preferably produced as die-cast parts from an aluminum material, wherein the electronics carrier is preferably formed as an injection-molded part with an insert-molded lead frame. In a suitable embodiment, the first and the second seal are in this case applied directly to the electronics carrier in a multi-component injection-molding process. To prevent leakage, the first seal is suitably produced from a water-resistant first elastomer material, and the second seal is produced from a heat-resistant and oil-resistant second elastomer material.

In a preferred application, the motor assembly is part of an actuator, in particular of a gearbox actuator, for a motor vehicle. In an intended installation situation, the actuator is arranged in a motor vehicle gearbox, for example in a direct shift gearbox or dual-clutch gearbox, for the purposes of performing gearshifts. Here, the electronics unit is screwed by way of fastening surfaces to a gearbox housing, wherein the motor housing or the electric motor is situated at least partially in an oil sump of the motor vehicle gearbox. For the fluid-tight sealing of the oil sump with respect to the gearbox housing, a ring-shaped seal is arranged in the region of the motor housing.

BRIEF DESCRIPTION OF THE SEVERAL VIEWS OF THE DRAWING

Exemplary embodiments of the invention will be discussed in more detail below on the basis of a drawing, in which.

Parts and dimensions which correspond to one another are denoted by the same reference designations throughout the figures.

DESCRIPTION OF THE INVENTION

Figure 1:
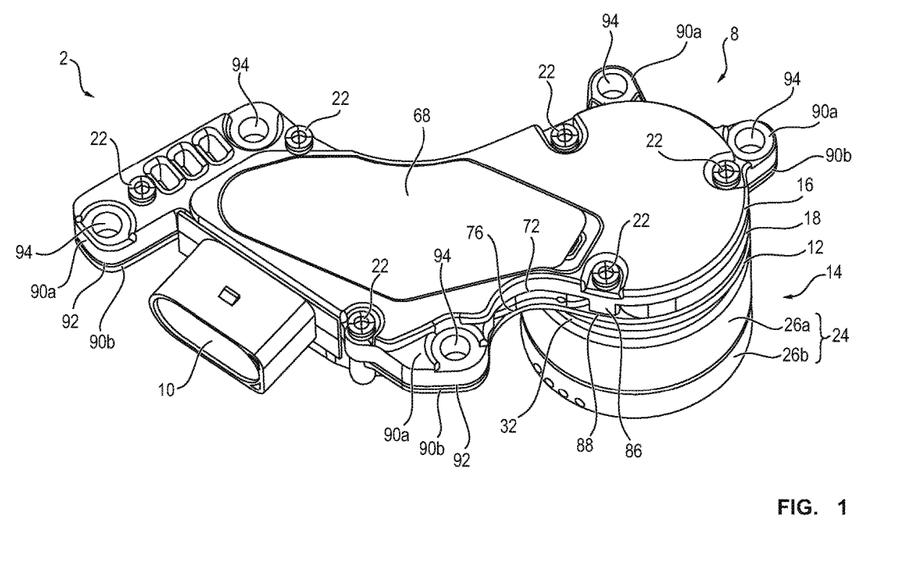
FIG. 1 shows, in a perspective illustration, a motor assembly for a gearbox actuator of a motor vehicle gearbox, comprising an electric motor and an electronics unit.

FIG. 1 illustrates a motor assembly 2 for an actuator 4 of a motor vehicle gearbox 6, in particular of a direct shift gearbox. The motor assembly 2 of the actuator 4, hereinafter also referred to as a gearbox actuator, comprises an elongate electronics unit 8 with a connecting plug connector 10 protruding at the narrow side, and comprises an electric motor 12 fastened to the electronics unit 8.

The electronics unit 8 comprises a first housing shell formed as a motor carrier 14, a second housing shell formed as a cooling cover 16, and an electronics carrier 18 arranged in sandwich-like fashion between the motor carrier 14 and the cooling cover 16. Here, the connecting plug connector 10 is integrally formed in unipartite fashion on a face side of the electronics carrier 18. By way of the connecting plug connector 10, an inverter circuit 20 of the electronics carrier 18 can be connected in electrically conductive fashion to motor vehicle electronics (not illustrated in any more detail) or to a motor vehicle harness for the purposes of energization and operation of the electric motor 12.

The motor carrier 14 and the cooling cover 16 are preferably produced in a die-casting process from an aluminum material, wherein the electronics carrier 18 is preferably produced as an injection-molded part from a plastics material.

Figure 2:
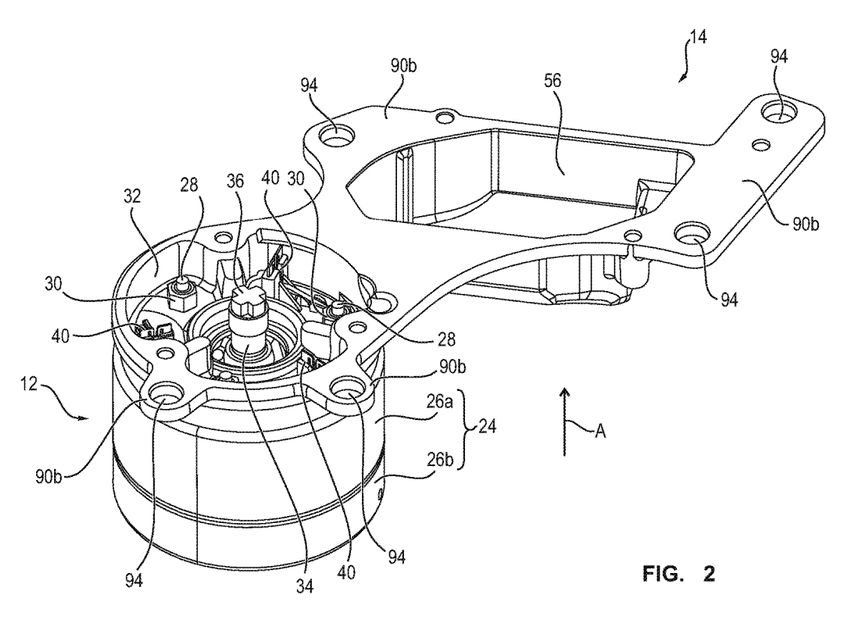
FIG. 2 shows, in a perspective illustration, a motor carrier of the electronics unit with the electric motor.

The motor carrier 14 and the cooling cover 16 are screwed together by way of six circumferentially distributed fastening screws 22, wherein the electronics carrier 18 is held clamped, or fixed by clamping, between the motor carrier 14 and the cooling cover 16. As can be seen in particular in FIG. 2, a cylindrical motor housing 24 of the preferably brushless electric motor 12 is fastened by way of screws to the motor carrier 14.

Figure 3:
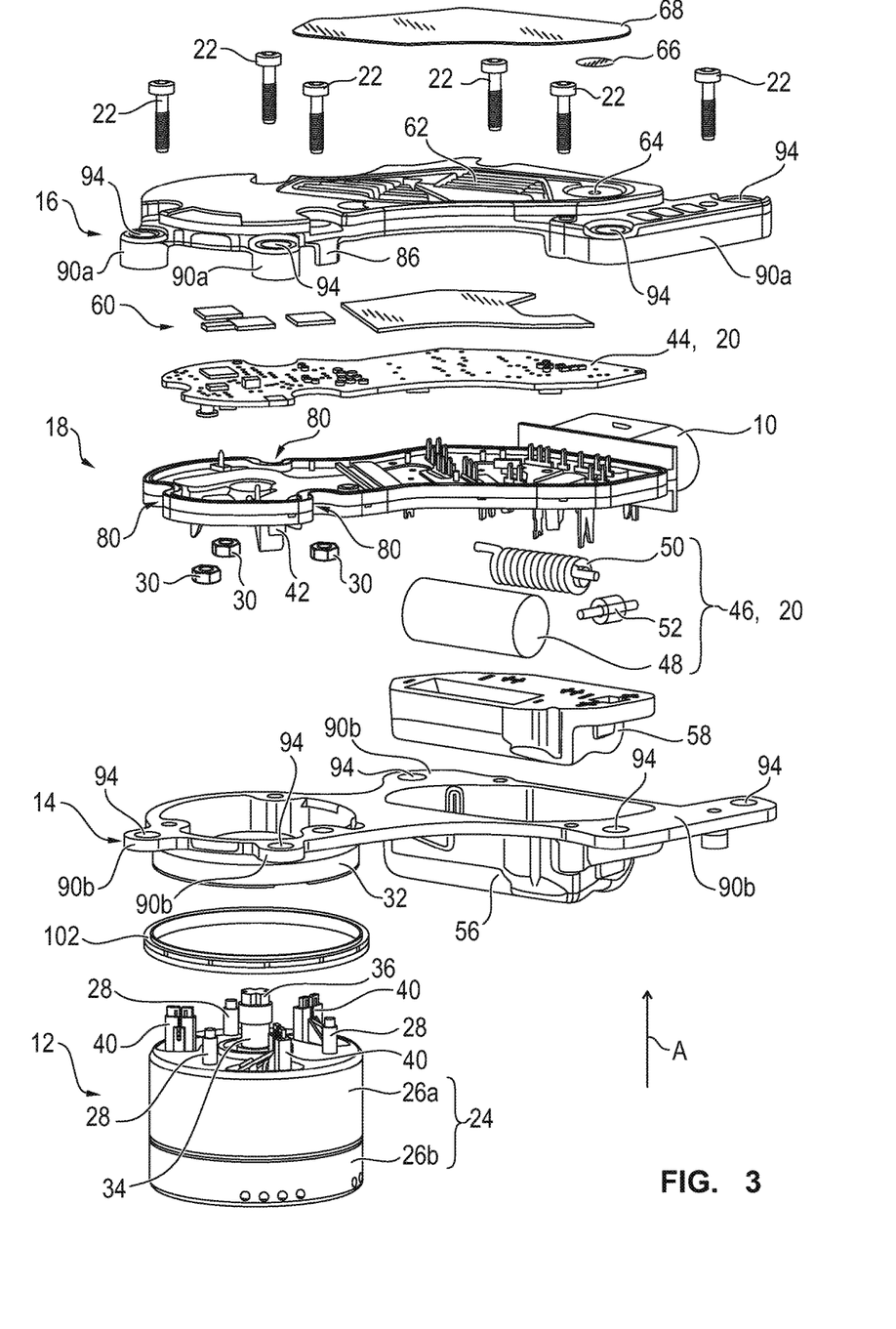
FIG. 3 shows, in a perspective exploded illustration, the motor assembly.

FIG. 3 shows the motor assembly 2 in a disassembled state by way of an exploded illustration.

The cylindrical motor housing 24 of the illustrated electric motor 12 is formed substantially by a first, pot-shaped housing half 26a and a second, pot-shaped housing half 26b, wherein the housing half 26a is dimensioned so as to have a housing height approximately twice that of the housing half 26b as viewed in an axial direction A. In the assembled state, the housing half 26a is fastened to the motor carrier 14 by way of three stud bolts 28, which are arranged, so as to be approximately uniformly offset with respect to one another by 120°, on the face side on the surface facing toward the motor carrier 14. As can be seen in particular in FIG. 2, in the assembled state, the stud bolts 28 are fastened with screw fastening action, from the direction of the inner side of the motor carrier 14, to the motor carrier 14 in the region of a cylindrical protuberance 32 by way of in each case one hexagonal nut 30.

In the assembled state, a rotor shaft 34 of a rotor, coupled in terms of drive to said rotor shaft, of the electric motor 12 protrudes out centrally through the housing half 26a. A magnetic cap 36 as a magnetic dipole encoder is attached rotationally conjointly to the motor carrier-side face side of the rotor shaft 34. The cap 36 has a number of permanent magnets, and in the assembled state, lies in a receptacle 38 of the electronics carrier 18. A Hall sensor element (not illustrated in any more detail) is arranged in the region of the receptacle 38, which Hall sensor element, during the operation of the motor assembly 2, monitors a motor rotational speed of the electric motor 12 by way of the alternating magnetic field of the rotating cap 36.

On the face side, the electric motor 12 has three phase terminals 40 which protrude out of the housing half 26a and which are coupled in electrically conductive fashion to phase windings of a (3-phase) rotating-field coil (not illustrated) of a stator assembly. The phase terminals 40, hereinafter also referred to as insulation displacement contacts, are, in the assembled state, contacted with in each case one motor-side contact element 42 of the electronics carrier 18 for the energization of the rotating-field coil. The contact elements 42 of the electronics carrier 18 are in particular in the form of blade contacts.

The electronic inverter circuit 20 of the electronics carrier 18 comprises a printed circuit board 44 with a number of switching elements (not shown in any more detail), and a passive component group 46. The component group 46 comprises substantially an intermediate circuit capacitor 48, a throttle coil 50 and a protective fuse 52. The printed circuit board 44 is arranged on a flat side, facing toward the cooling cover 16 and hereinafter also referred to as top side, of the electronics carrier 18. The component group 46 is arranged on the opposite flat side, facing toward the motor carrier 14 and correspondingly hereinafter also referred to as bottom side, of the electronics carrier 18.

For the contacting of the printed circuit board 44 with the component group 46, the electronics carrier 18 has an integrated (insert-molded) lead frame 54 as part of the inverter circuit 20. The lead frame 54 couples the individual electronic components in electrically conductive fashion by way of a number of blade contacts (not designated in any more detail). The lead frame 54 is furthermore connected in electrically conductive fashion to the connecting plug connector 10.

In the assembled state, the component group 46 is arranged within a trough-like protuberance 56 of the motor carrier 14. For protection against vibrations, the component assembly 46 is at least partially encapsulated within the protuberance 56 by way of a cast part 58 composed of a damping plastics material.

The printed circuit board 44 is coupled in thermally conductive fashion to the cooling cover 16 by way of a heat-conducting layer 60, for example in the form of a thermally conductive adhesive. The cooling cover 16 has, on its outer surface, that is to say on the cooling cover side averted from the electronics carrier 18, a number of integrally formed cooling fins 62. By way of example, only one cooling fin 62 is denoted by a reference designation in the figures.

In the region of the cooling fins 62, there is arranged a cutout 64 which, in the assembled state, permits an exchange of air from the printed circuit board 44 to a region outside the cooling cover 16. In the assembled state, the cutout 64 is covered in water-tight fashion by way of a semipermeable diaphragm 66, which is permeable to air. Thus, by way of the diaphragm 66, it is firstly the case that both a pressure equalization and an exchange of air for cooling purposes are made possible. Secondly, by way of the diaphragm 66, an ingress of water or moisture is counteracted, for the purposes of protecting the inverter circuit 20, in a structurally simple manner. The cooling fins 62 and the diaphragm 66 are, in the assembled state, concealed by a common cover 68.

Figure 4:
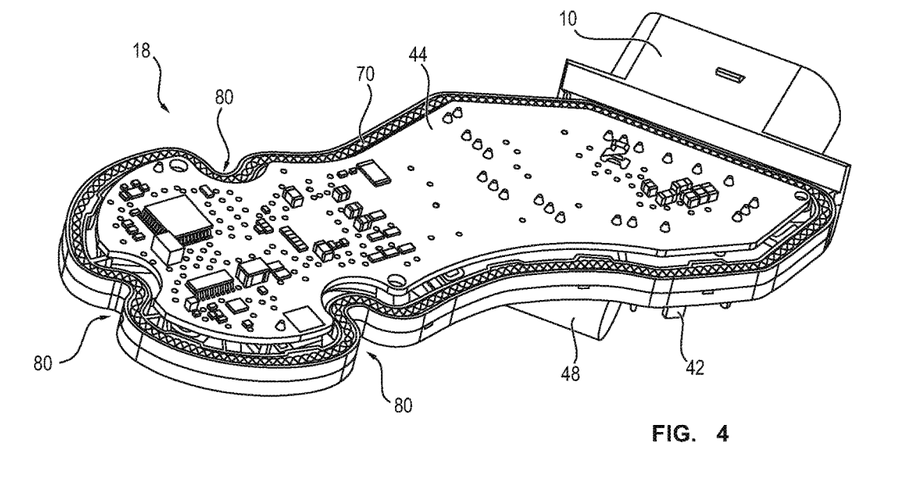
FIG. 4 shows, in a perspective illustration, an electronics carrier of the electronics unit, with a view of a first seal.
Figure 5:
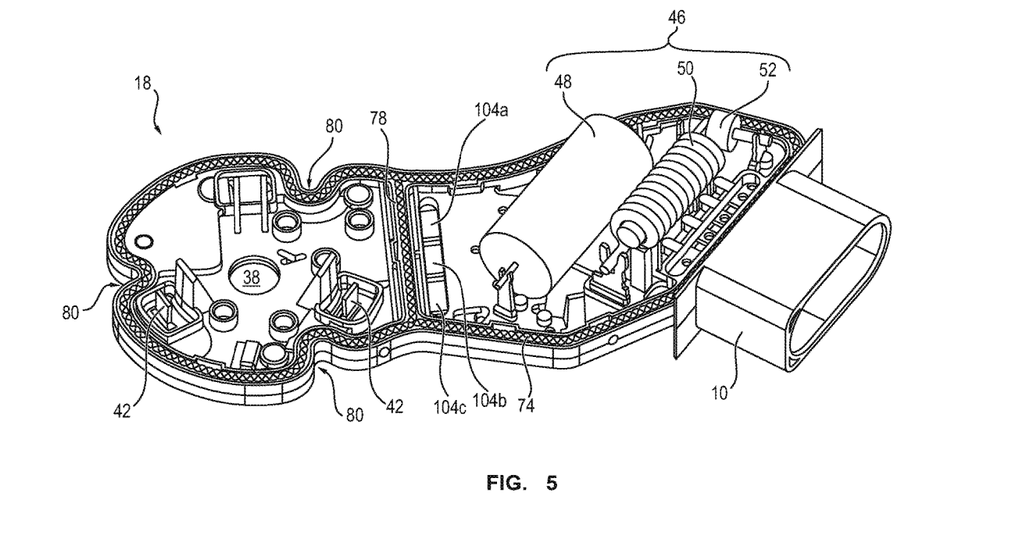
FIG. 5 shows, in a perspective illustration, an electronics carrier of the electronics unit, with a view of a second seal with an internal web.

The construction of the electronics carrier 18 is illustrated in more detail in FIGS. 4 and 5. At the cooling cover side, the electronics carrier 18 has a first seal 70 which runs in a circumferential direction and by means of which a first contact edge 72 at the contact point between the cooling cover 16 and the electronics carrier 18 is sealed off in fluid-tight fashion. On the opposite side, that is to say at the motor carrier side, the electronics carrier 18 has a second seal 74 which runs in complementary fashion and which correspondingly seals off in fluid-tight fashion a second contact edge 76 at the contact point between the electronics carrier 18 and the motor carrier 14.

The seals 70, 74 are in particular arranged in alignment with one another such that, in the case of a screw fastening of the cooling cover 16 to the motor carrier 14—by way of the fastening screws 22—the seals 70 and 74 are substantially supported on one another. In this way, upon the clamping or clamped fastening between the motor carrier 14 and the cooling cover 16 being realized, the electronics carrier 18 is subjected substantially only to pressure forces in the region of the contact edges 72, 76, without significant torsion or bending forces acting on the electronics carrier 18.

The seals 70, 74 and the contact edges 72, 76 are arranged substantially behind the connecting plug connector 10, that is to say the connecting plug connector 10 is arranged on an outer circumference of the electronics carrier 18 so as to protrude beyond both the cooling cover 16 and the motor carrier 14. The connecting plug connector 10 is thus coupled to the interior chamber of the electronics unit 8 only by way of the insert-molded lead frame 54, such that the connecting plug connector 10 requires no additional sealing.

The seal 74 has an internal web 78 which divides the seal 74 in the manner of a secant in a region between the protuberances 32 and 56 in the assembled state. That is to say, the internal web 78 runs from one long side of the seal 74 to the opposite long side, wherein the internal web 78 is preferably oriented approximately perpendicular to the two long sides. In the region of the protuberance 32, the electronics carrier 18 has three circumferential indentations 80, in which, in the assembled state, in each case one fastening screw 22 is arranged.

The seals 70, 74 have an approximately meandering form in order to realize an improved force distribution during the clamped fastening of the electronics carrier 18. The seals 70 and 74 are preferably produced together with the electronics carrier 18 in a multi-component injection-molding process.

In the assembled state, a top-side housing chamber 82 is formed between the electronics carrier 18 and the cooling cover 16. As can be seen in particular in FIG. 6, the housing chamber or electronics chamber 82 is at least partially filled with the layer 60, and is separated in fluid-tight fashion by way of the electronics carrier 18 from a bottom-side housing chamber 84 between the electronics carrier 18 and the motor carrier 14. The housing chamber 84 is formed substantially by the subregions 84a, 84b defined by the protuberances 32 and 56. Below, the subregion 84a of the protuberance 32 will also be referred to as a terminal region 84a, and the subregion 84b of the protuberance 56 will also be referred to as a circuit region 84b. By way of the internal web 78, the terminal region 84a and the circuit region 84b are delimited in fluid-tight fashion between the electronics carrier 18 and the motor carrier 14.

In the region of the indentations 80, in each case one spacer element 86 of the cooling cover 16 is arranged in alignment with respect to an outer circumference. The spacer elements 86 engage around the electronics carrier 18 and bear against the motor carrier 14 so as to form in each case one abutment surface 88. The spacer elements 86 are integrally formed on the cooling cover 16 in the region of the contact edge 72 and protrude beyond the cooling cover 16 in the direction of the motor carrier 14. The spacer elements 86 preferably have a height which corresponds approximately to the thickness of the electronics carrier 18.

The electronics unit 8 furthermore has four circumferentially protruding projections 90a of the cooling cover 16, and four projections 90b, arranged in complementary fashion with respect thereto, of the motor carrier 14. The projections 90a and 90b are, in the assembled state, arranged one on top of the other over a large area and in an aligned manner so as to form in each case one fastening surface 92.

The projections 90a engage around the electronics carrier 18 in sections, similarly to the spacer elements 86, wherein the projections 90a in this case preferably have, similarly to the spacer elements 86, a height which corresponds approximately to the thickness of the electronics carrier 18. The spacer elements 86 and the projections 90a thus ensure, during the assembly of the motor assembly 2, a predefined contact or seal pressure for the bracing between the cooling cover 16 and the motor carrier 14.

The projections 90a, 90b are integrally formed in each case in pairwise fashion in the region of the terminal region 84a and in the region of the circuit region 84b, wherein the projections 90a, 90b in the terminal region 84a are in particular of eyelet-shaped form, and wherein the projections 90a, 90b in the circuit region 84b are in particular of lug-like form.

The projections 90a, 90b have five screw holes 94 which are arranged so as to be distributed in the circumferential direction. As can be seen in particular in FIG. 6, in the assembled state of the gearbox actuator 4 on the motor vehicle gearbox 6, there is arranged within the screw holes 94 in each case one fastening screw 96 for the screw fastening of the gearbox actuator 4 to a gearbox housing 98 of the motor vehicle gearbox 6. In this way, the motor assembly 2 is fixed in the region of the fastening surfaces 92 to the gearbox housing 98. The gearbox housing 98 has a large thermal mass, and in the assembled state, acts for example as a heat sink for the motor assembly 2.

Figure 6:
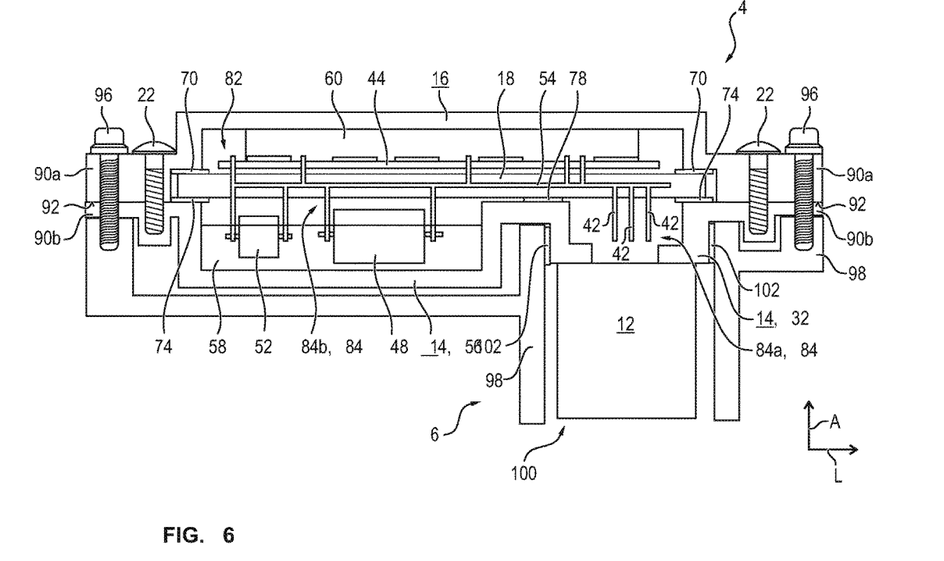
FIG. 6 shows, in a schematic sectional illustration, the gearbox actuator in an installed situation on a gearbox housing of the motor vehicle gearbox.

In the illustrated assembled state of the gearbox actuator 4, the electric motor 12 is coupled in terms of drive to an oil pump (not illustrated in any more detail), and is situated at least partially in an oil of an oil sump 100. For the fluid-tight sealing of the oil sump 100, a ring-shaped seal 102 is arranged between the protuberance 32 and the gearbox housing 98.

Figure 7:
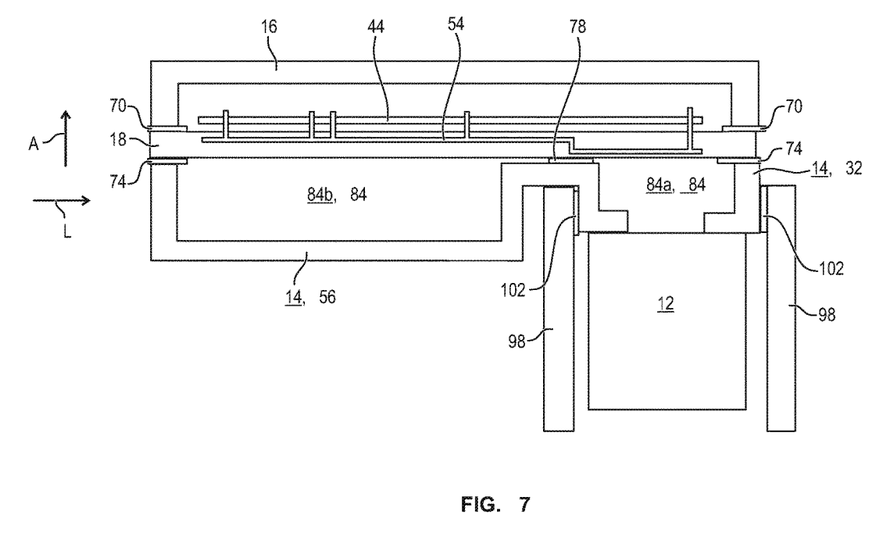
FIG. 7 shows, in a schematic and simplified sectional illustration, an alternative embodiment of the gearbox actuator, with a bent lead frame.

For the additional stiffening of the electronics carrier 18, the lead frame 54 is of bent form in the region of the internal web 78—as indicated in FIG. 7. Various exemplary embodiments with regard to partial or step-like bends or bent-over configurations of the lead frame 54 will be discussed in more detail below on the basis of FIGS. 8 to 12.

Figure 8:
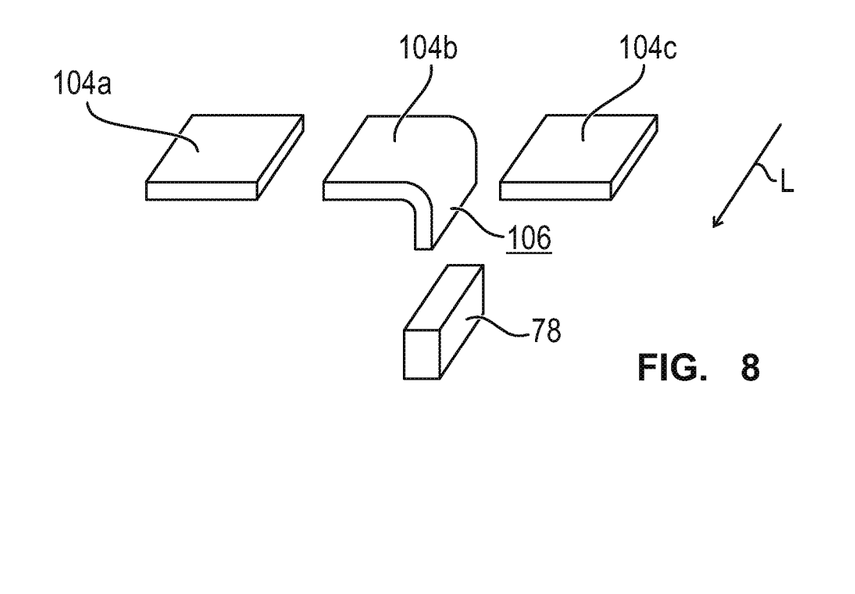
FIG. 8 shows, in a perspective illustration, a detail of three conductor tracks of the lead frame and the internal web.

FIG. 8 illustrates a detail of three conductor tracks 104a, 104b, 104c, adjacent and running substantially parallel, of the lead frame 54 in the region of the internal web 78. In this exemplary embodiment, a conductor longitudinal direction L of the conductor tracks 104a, 104b, 104c is arranged substantially parallel to the profile of the internal web 78, wherein the middle conductor track 104b is partially bent over directly in the region of the internal web 78. As is relatively clearly apparent in FIG. 8, the conductor track 104b has, in said region and as viewed along the conductor longitudinal direction L, an approximately L-shaped cross-sectional profile, wherein the horizontal limb of the L is in the form of a lug 106 bent toward the motor carrier 14.

Figure 9:
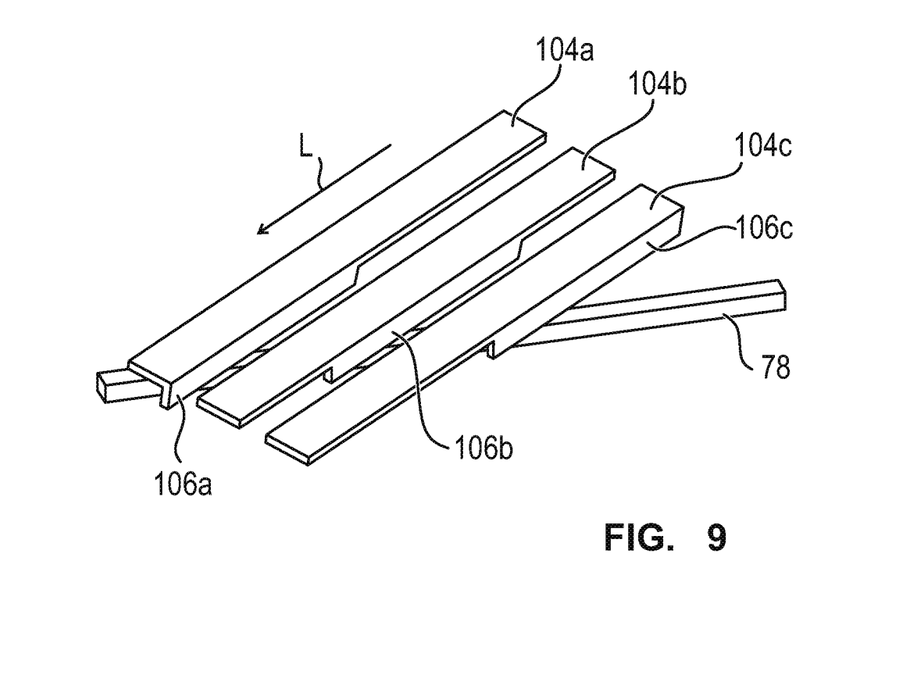
FIG. 9 shows, in a perspective illustration, a detail of an alternative embodiment of the three conductor tracks.

FIG. 9 shows an embodiment in which the conductor tracks 104a, 104b, 104c are positioned so as to be oriented obliquely with respect to the internal web 78, that is to say the conductor longitudinal direction L is arranged so as to be skewed relative to the internal web 78 by an angle about the axial direction A. The conductor tracks 104a, 104b, 104c are, similarly to the exemplary embodiment of FIG. 8, partially bent over in the region of lugs 106a, 106b, 106c which protrude transversely with respect to the conductor longitudinal direction L. The bent-over lugs 106a, 106b, 106c overlap along the profile of the internal web 78 in the direction transverse to the conductor longitudinal direction L.

Figure 10A:
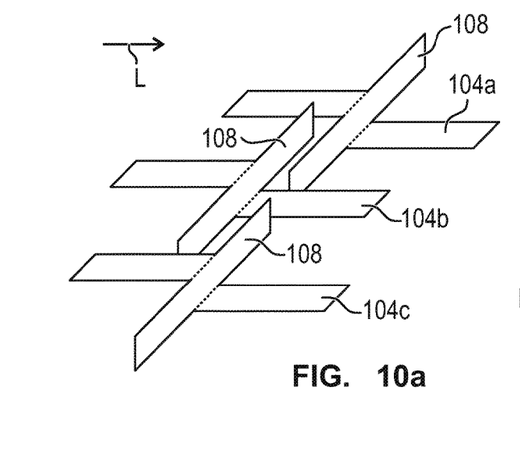
FIG. 10a shows, in a perspective illustration, a second alternative embodiment of the conductor tracks with horizontally protruding beams as step-like bent-over regions.
Figure 10B:
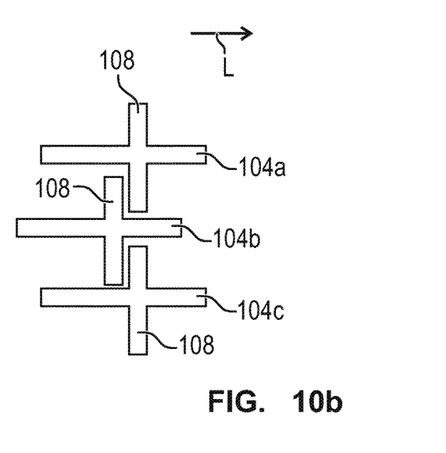
FIG. 10b shows, in a plan view, the conductor tracks with the beams in a non-bent state.

The exemplary embodiment illustrated in FIGS. 10a and 10b shows substantially three conductor tracks 104a, 104b, 104c which are/or can be bent over in step-like fashion. The conductor tracks 104a, 104b, 104c have, in the region of the internal web 78, arms or beams 108 which extend transversely with respect to the conductor longitudinal direction L and which, in the bent-over state, overlap at least partially along the conductor longitudinal direction L, and thus stiffen the electronics carrier 18 with regard to a bending moment in said region. The bent-over edges in the bent-over state are indicated in FIG. 10a by way of dashed lines. The step height of the lead frame 54 thus formed is predefined substantially by the width of the beams 108.

Figure 11:
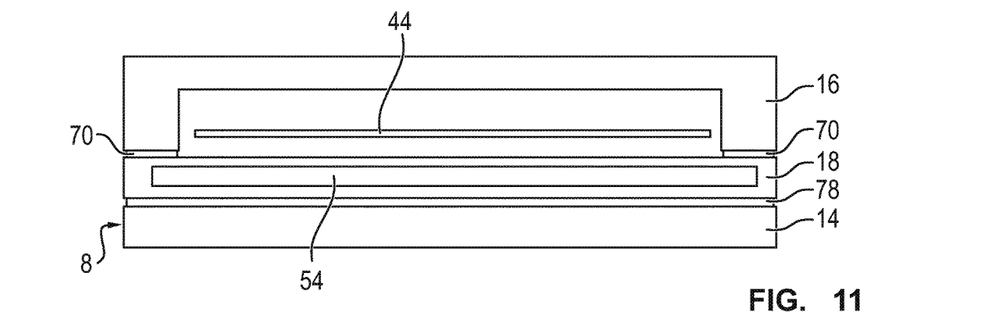
FIG. 11 shows, in a schematic sectional illustration, the electronics unit with a first alternative embodiment of the bent-over region in the region of the internal web.
Figure 12:
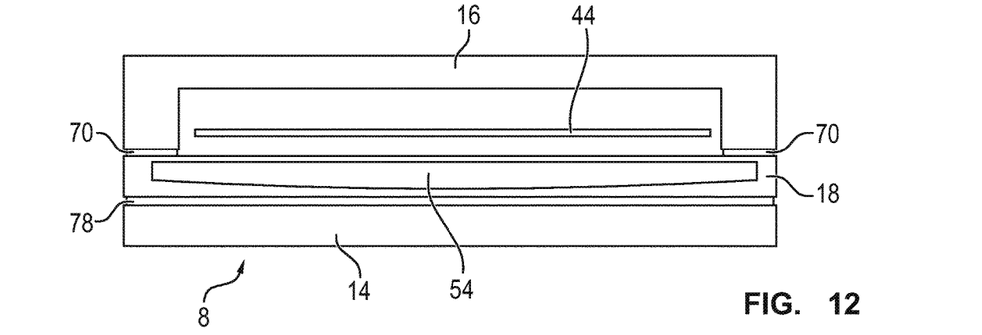
FIG. 12 shows, in a schematic sectional illustration, the electronics unit with a second alternative embodiment of the bent-over region in the region of the internal web.

FIGS. 11 and 12 show, in a sectional illustration along the internal web 78, the electronics unit 8 in a plan view of a bent-over portion of the lead frame 54. For the discharge of forces, the bent-over region of the lead frame 54 in this case extends toward the circumference as far as between the contact edges 72, 74. In FIG. 12, the bent-over region has, toward the outer circumference, a narrowing whereby a material saving is realized in relation to the exemplary embodiment of FIG. 11.

The invention is not restricted to the exemplary embodiments described above. Rather, other variants of the invention may also be derived from these by a person skilled in the art, without departing from the subject matter of the invention. In particular, it is also the case that all individual features described in conjunction with the exemplary embodiments may also be combined with one another in some other way without departing from the subject matter of the invention.

LIST OF REFERENCE DESIGNATIONS

2 Motor assembly
4 Actuator/gearbox actuator
6 Motor vehicle gearbox
8 Electronics unit
10 Connecting plug connector
12 Electric motor
14 Motor carrier/housing shell
16 Cooling cover/housing shell
18 Electronics carrier
20 Inverter circuit
22 Fastening screws
24 Motor housing
26a, 26b Housing half
28 Stud bolt
30 Hexagonal nut
32 Protuberance
34 Rotor shaft
36 Cap
38 Receptacle
40 Phase terminal/insulation displacement contact
42 Contact element/blade contact
44 Printed circuit board 46 Component group
48 Intermediate circuit capacitor
50 Throttle coil
52 Protective fuse
54 Cast part
56 Protuberance
60 Layer
62 Cooling fin
64 Cutout
66 Diaphragm
68 Cover
70 Seal
72 Contact edge
74 Seal
76 Contact edge
78 Internal web
80 Indentation
82 Housing chamber/electronics chamber
84 Housing chamber
84a Subregion/terminal region
84b Subregion/circuit region
86 Spacer element
88 Abutment surface
90a, 90b Projection
92 Fastening surface
94 Screw hole
96 Fastening screw
98 Gearbox housing
100 Oil sump
102 Ring-shaped seal
104a, 104b, 104c Conductor track
106 Lug
106a, 106b, 106c Lug
108 Beam
A Axial direction
L Conductor longitudinal direction

The invention claimed is:

1. A motor assembly, comprising:
an electric motor having a motor housing;
an electronics unit including:
a first housing shell being a motor carrier and having said motor housing fastened thereto;
a second housing shell being a cooling cover; and
an electronics carrier sandwiched between said cooling cover and said motor carrier, said electronics carrier having, at a cooling cover side, a first, circumferentially encircling seal sealing off a first contact edge between said electronics carrier and said cooling cover, and said electronics carrier having, at a motor carrier side, a second, circumferentially encircling seal sealing off a second contact edge between said electronics carrier and said motor carrier;
an electronic inverter circuit carried on said electronics carrier and being connected, in a terminal region of a motor carrier-side surface of said electronics carrier, by way of contact elements to phase terminals of said electric motor; and
said terminal region being, by way of a secant-like internal web of said second seal, delimited in fluid-tight fashion with respect to a circuit region of the motor carrier-side surface of said electronics carrier, on which at least one electronic component of said electronic inverter circuit is arranged.

2. The motor assembly according to claim 1, wherein said motor carrier and said cooling cover are braced directly against one another.

3. The motor assembly according to claim 2, wherein said first seal and said second seal are aligned with one another in a direction of a bracing action of said motor carrier and of said cooling cover.

4. The motor assembly according to claim 1, which comprises a plurality of spacer elements integrally formed on said cooling cover, said spacer elements extending from the motor carrier side and engaging around said electronics carrier at least in sections and bearing in each case against an abutment surface of said motor carrier.

5. The motor assembly according to claim 4, wherein said cooling cover and said motor carrier are screwed to one another in a region of said spacer elements.

6. The motor assembly according to claim 1, wherein said electronics unit includes a connecting plug connector integrated in unipartite fashion into said electronics carrier, and wherein said connecting plug connector is contacted with a lead frame, arranged within said electronics carrier, of said electronic inverter circuit.

7. The motor assembly according to claim 6, wherein said lead frame is bent partially or in steps in the region of an internal web of said second seal for stabilizing said electronics carrier.

8. The motor assembly according to claim 7, wherein said lead frame comprises a plurality of adjacent conductor tracks and said conductor tracks have, in a region of the internal web, perpendicularly protruding beams forming stepped bent-over regions, and wherein said beams of mutually adjacent conductor tracks at least partially overlap.

9. The motor assembly according to claim 1, wherein said first seal and said second seal are applied directly to said electronics carrier in a multi-component injection-molding process.

10. An actuator for a motor vehicle, the actuator comprising a motor assembly according to claim 1.

11. The actuator according to claim 10, configured as a gearbox actuator.

12. A motor vehicle transmission, comprising:
a gearbox housing, an oil sump, and an actuator having a motor assembly according to claim 1;
wherein:
the electronics unit of said motor assembly is screwed to said gearbox housing;
the motor housing of said motor assembly is disposed, at least partially, in the oil sump; and
a ring-shaped seal is arranged on the motor carrier in a region of the motor housing, and said ring-shaped seal is configured to seal off said oil sump in fluid-tight fashion with respect to said gearbox housing.

* * * * *